United States Patent
Takeuchi et al.

(10) Patent No.: US 8,099,986 B2
(45) Date of Patent: Jan. 24, 2012

(54) STEERING MEANS LOCKING APPARATUS

(75) Inventors: Yoshiaki Takeuchi, Saitama (JP); Takeshi Konno, Saitama (JP); Tadashi Onozuka, Saitama (JP); Koichi Nozoe, Saitama (JP); Kazuo Yuhi, Miyazaki (JP)

(73) Assignees: Honda Motor Co., Ltd., Tokyo (JP); Honda Lock Mfg. Co., Ltd., Miyazaki (JP)

( * ) Notice: Subject to any disclaimer, the term of this patent is extended or adjusted under 35 U.S.C. 154(b) by 978 days.

(21) Appl. No.: 12/077,958

(22) Filed: Mar. 21, 2008

(65) Prior Publication Data

US 2008/0236216 A1  Oct. 2, 2008

(30) Foreign Application Priority Data

Mar. 27, 2007 (JP) ................................. 2007-082558

(51) Int. Cl.
  *B60R 25/02* (2006.01)
(52) U.S. Cl. .......................................... 70/186; 70/252
(58) Field of Classification Search .................... 70/186, 70/252, 182–185
  See application file for complete search history.

(56) References Cited

U.S. PATENT DOCUMENTS

| | | | | |
|---|---|---|---|---|
| 1,832,540 A * | 11/1931 | Fairchild | ........................ | 70/252 |
| 2,218,730 A * | 10/1940 | Talent | ............................ | 70/255 |
| 2,295,723 A * | 9/1942 | Duncan | ........................... | 70/186 |
| 2,295,807 A * | 9/1942 | Sandberg | ........................ | 70/252 |
| 2,478,016 A * | 8/1949 | Sandberg | ........................ | 70/252 |
| 5,124,565 A * | 6/1992 | Yoshida et al. | .............. | 340/5.61 |
| 5,343,077 A | 8/1994 | Yoshida et al. | | |
| 5,595,257 A | 1/1997 | Yoshida et al. | | |
| 7,071,819 B2 * | 7/2006 | Konno et al. | ................. | 340/427 |
| 7,802,649 B2 * | 9/2010 | Konno et al. | ................. | 180/287 |
| 2004/0027239 A1 * | 2/2004 | Hayashi et al. | .............. | 340/5.61 |
| 2004/0182121 A1 * | 9/2004 | Fukatsu et al. | .................. | 70/186 |
| 2004/0239484 A1 | 12/2004 | Hata | | |
| 2005/0132765 A1 * | 6/2005 | Nagae et al. | .................... | 70/252 |
| 2005/0183476 A1 * | 8/2005 | Feucht et al. | .................... | 70/186 |
| 2006/0261673 A1 | 11/2006 | Unno | | |
| 2006/0261674 A1 | 11/2006 | Unno | | |
| 2010/0229611 A1 * | 9/2010 | Konno et al. | .................... | 70/252 |

FOREIGN PATENT DOCUMENTS

| | | |
|---|---|---|
| EP | 0 604 981 A2 | 7/1994 |
| EP | 1 724 165 A1 | 11/2006 |
| JP | 6-247359 | 9/1994 |
| JP | 3566736 | 9/1994 |

(Continued)

*Primary Examiner* — Lloyd Gall
(74) *Attorney, Agent, or Firm* — Carrier Blackman & Associates, P.C.; Joseph P. Carrier; William D. Blackman (57) ABSTRACT

A handlebars locking apparatus for locking and unlocking of the handlebars on the basis of a code collation is provided. A collation ECU releases a restriction of a rotor latched by a latch by driving a solenoid if an ignition switch is turned OFF while a lock pin is retracted. After releasing the restriction, rotation of the rotor is restricted by the latch and a code collation with a code stored in a portable key is carried out if a lock pin is in a protrusion state after the release of the restriction and the protrusion state is detected by a lock side switch. If the code collation is correctly carried out, the protrusion of the lock pin is maintained to lock the handlebars. If the code collation is not correctly completed, the restriction of the rotor is released so as to be returned into an unlocked state.

12 Claims, 9 Drawing Sheets

FOREIGN PATENT DOCUMENTS

| | | |
|---|---|---|
| JP | 2006-321452 | 11/2006 |
| JP | 2006-321454 | 11/2006 |
| JP | 2006-327303 | 12/2006 |
| JP | 2006-327304 | 12/2006 |

* cited by examiner

UNLOCKED STATE

Fig. 4

LOCK STANDBY STATE

Fig. 5

START FOR LOCKING

Fig. 6

LOCKED STATE

LOCKED STATE

Fig. 11

RELEASING LOCKED STATE

Fig. 12

UNLOCKED STATE

STEERING MEANS LOCKING APPARATUS

BACKGROUND OF THE INVENTION

1. Field of the Invention

The present invention relates to a steering means (such as a steering wheel or handlebars) locking apparatus which can control locking operation and unlocking operation of a lock of a steering means on the basis of a result of a code collation with a portable key.

2. Description of the Related Art

Conventionally, a steering means locking apparatus for holding a steering means so as to restrain rotation of the steering means while a vehicle is stopping has been known. Such a steering means locking apparatus has a structure so as to restrain rotation of the steering means by engaging a lock pin protruding from a vehicle body into an engagement hole that is defined on a rotational shaft or the like which supports the steering means.

In the Patent Document 1, the structure such that a lock of a steering means is not unlocked without a right code collation is made in a steering means locking apparatus for carrying out a code collation with a portable key having an IC chip mounted therein of a motorcycle.

[Patent Document 1] Japanese Patent Application Laid-Open (JP-A) No. 3566736

However, there has been a possibility such that a convenience or the like of a steering means locking apparatus can be more improved if a code collation upon operation of the steering means locking apparatus is also carried out not only upon unlocking of the steering means but also upon locking thereof.

SUMMARY OF THE INVENTION

An object of the present invention is to provide a steering means locking apparatus which can control the unlocking operation and the locking operation of locking of a steering means on the basis of a result of a code collation with a portable key.

The first feature of the steering means locking apparatus according to the present invention is that the apparatus having a lock pin that can move between a locked position and an unlocked position responding to the operation of an operational member, a biasing means for giving a bias force always in a direction returning back the lock pin to the unlocked position, and a latching means for restricting movement between protrusion position and retraction position of the lock pin, wherein, the steering means locking apparatus comprises a control unit for controlling driving of the latching means, the control unit is configured so as to release the movement restriction of the lock pin restricted by the latching means responding to switching operation for switching a main power source of the vehicle from ON to OFF to lock the steering means, then after releasing the restriction, if a protrusion of the lock pin to the locked position is detected, the unit carries out code collation of a portable key's code, the code is peculiar to a specific vehicle, and if the code collation is correctly carried out, the control unit maintains the lock pin in the locked position to lock the steering means, on the other hand, if the code collation is not correctly carried out, the control unit does not maintain the lock pin to return the lock pin to the unlocked position.

The second feature of the steering means locking apparatus according to the present invention is that the apparatus having a lock pin that can move between a locked position and an unlocked position responding to the operation of an operational member, a biasing means for giving a bias force always in a direction returning back the lock pin to the unlocked position, and a latching means for restricting movement between protrusion position and retraction position of the lock pin, wherein, the steering means locking apparatus comprises a control unit for controlling driving of the latching means, the control unit is configured so as to carry out code collation of a portable key's code, the code is peculiar to a specific vehicle, when the operational member is operated to a predetermined locked position after a main power source of the vehicle switched from ON to OFF to lock the steering means, and if the code collation is correctly carried out, the control unit maintains the lock pin in the locked position to lock the steering means, on the other hand, if the code collation is not correctly carried out, the control unit does not maintain the lock pin to return the lock pin to the unlocked position.

The third feature of the steering means locking apparatus according to the present invention is that the control unit is configured so as to carry out code collation of a portable key's code, if the operation to switch the main power source OFF to ON for unlocking the steering means is detected, and if the code collation is correctly carried out, the control unit releases the movement restriction, and maintains the lock pin in the unlocked position, on the other hand, if the code collation is not correctly carried out, the control unit maintains the lock pin in the locked position.

The fourth feature of the steering means locking apparatus according to the present invention is that a lock side switch to detect that the lock pin is located in a locked position, and an unlock side switch to detect that the lock pin is located in an unlocked position.

The fifth feature of the steering means locking apparatus according to the present invention is that if the operation for switching the main power source from ON into OFF is carried out when the lock pin is located in the unlocked position, the control unit releases the movement restriction of the movement of the lock pin, if an output signal from the lock side switch or the unlock side switch is detected since the lock pin is protruded to the locked position responding to the operation of the operational member after the restriction is released, the control unit carries out the code collation when the lock of the steering means is locked.

The sixth feature of the steering means locking apparatus according to the present invention is that the steering means locking apparatus comprises a rotational member to be coupled with the lock pin, the rotational member is connected to the operational member via an operation cable, the lock pin is configured to be coupled with the rotational member so as to carry out reciprocating movement in conjunction with the rotation of the rotational member and to make it impossible to operate a steering means of a vehicle since the lock pin is made from an immersive state into a protrusion state responding to the reciprocating movement, the latching member comprises a latching switch to restrict the rotation of the rotational member and detect a movement restriction state of the lock pin by the latching member, the biasing member is attached to the rotational member so as to provide a bias force to rotate the rotational member into a direction of returning of the lock pin and the lock side switch and the unlock side switch are configured so as to detect the respective lock position and unlock position of the lock pin.

According to the sixth features, when the latching means is engaged with a peripheral portion of the rotational member, as compared to a method for directly restricting movement of the lock pin which carries out the reciprocating movement, a width for the movement between the locked position and the unlocked position can be easily enlarged, so that a reliability of the restriction of the movement can be improved and a productivity of the parts can be improved. In addition, a lock side switch and an unlock side switch are configured so as to detect the position of the lock pin, so that, as compared to a structure to detect the position of the rotational member, by way of a simple switch structure, it is possible to detect the locked state and the unlocked state of the steering means locking apparatus. In addition, it is possible to prevent locking when the user does not intend to operate the apparatus since the code is collated and the steering means is locked after the operation of the operational member or the operation for protruding the lock pin, namely, after the user's intention to operate the apparatus is checked in the case that a main power source is turned off.

According to the third feature, when a user who has a portable key is away from a vehicle, it is possible to prevent the steering means locking apparatus from being switched from the locked state to the unlocked state. In addition, when the main power source has been turned on, it is possible to securely hold the lock pin in the unlocked position.

According to the fourth feature, the position of the lock pin is clearly detected, so that it is possible to insure driving control of the latching means by means of the control unit.

According to a fifth invention, after checking that the operation for protruding the lock pin is securely made, the code collation can be started, so that the error operation can be prevented.

According to the sixth features, when the latching means is engaged with a peripheral portion of the rotational member, as compared to a method for directly restricting movement of the lock pin which carries out the reciprocating movement, a width for the movement between the locked position and the unlocked position can be easily enlarged, so that a reliability of the restriction of the movement can be improved and a productivity of the parts can be improved. In addition, a lock side switch and an unlock side switch are configured so as to detect the position of the lock pin, so that, as compared to a structure to detect the position of the rotational member, by way of a simple switch structure, it is possible to detect the locked state and the unlocked state of the steering means locking apparatus.

DETAILED DESCRIPTION OF THE PREFERRED EMBODIMENTS

Figure 1:
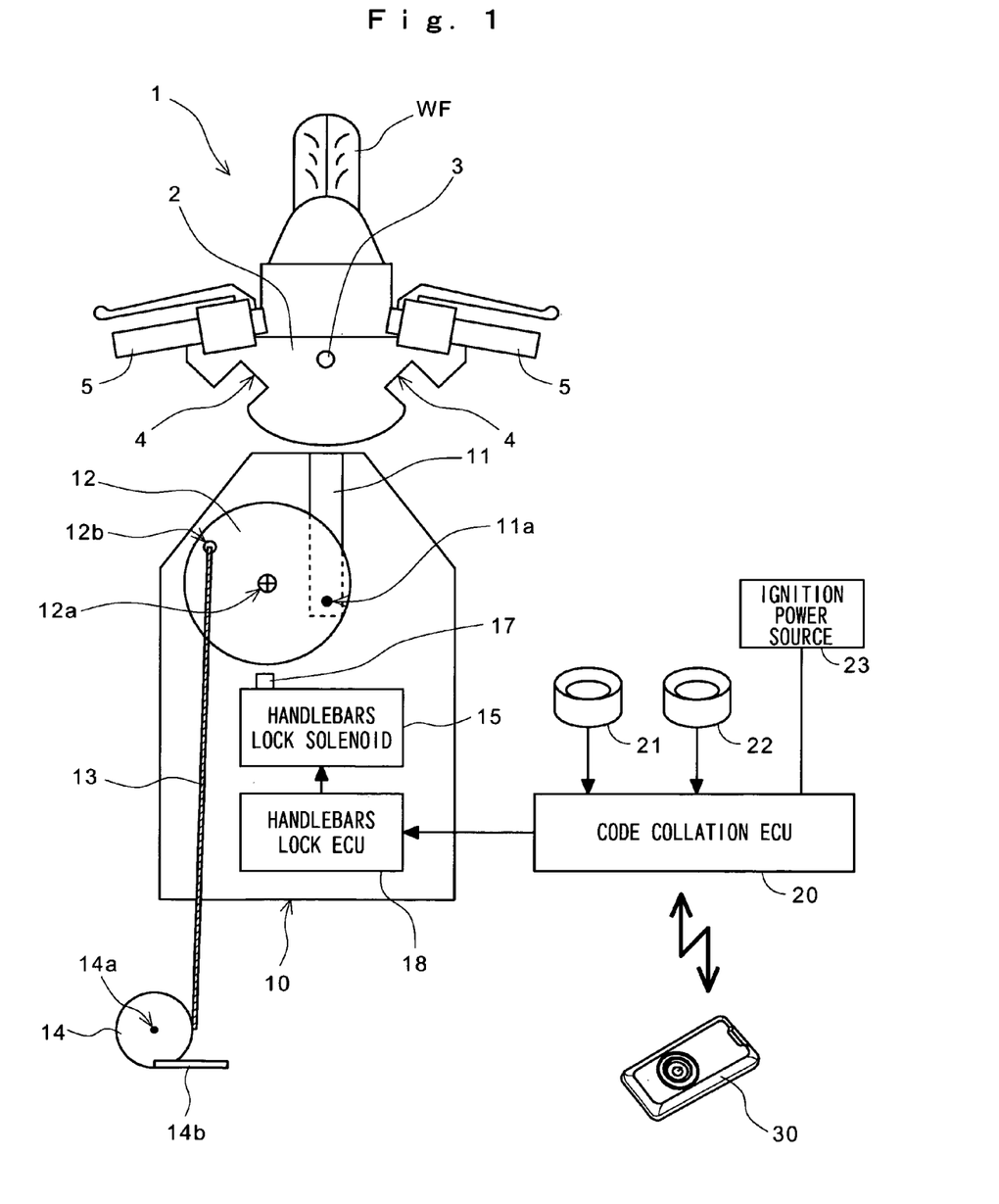
FIG. 1 is a block diagram showing a structure of a handlebars locking apparatus of a motorcycle according to an embodiment of the present invention (an unlocked state).
Figure 2:
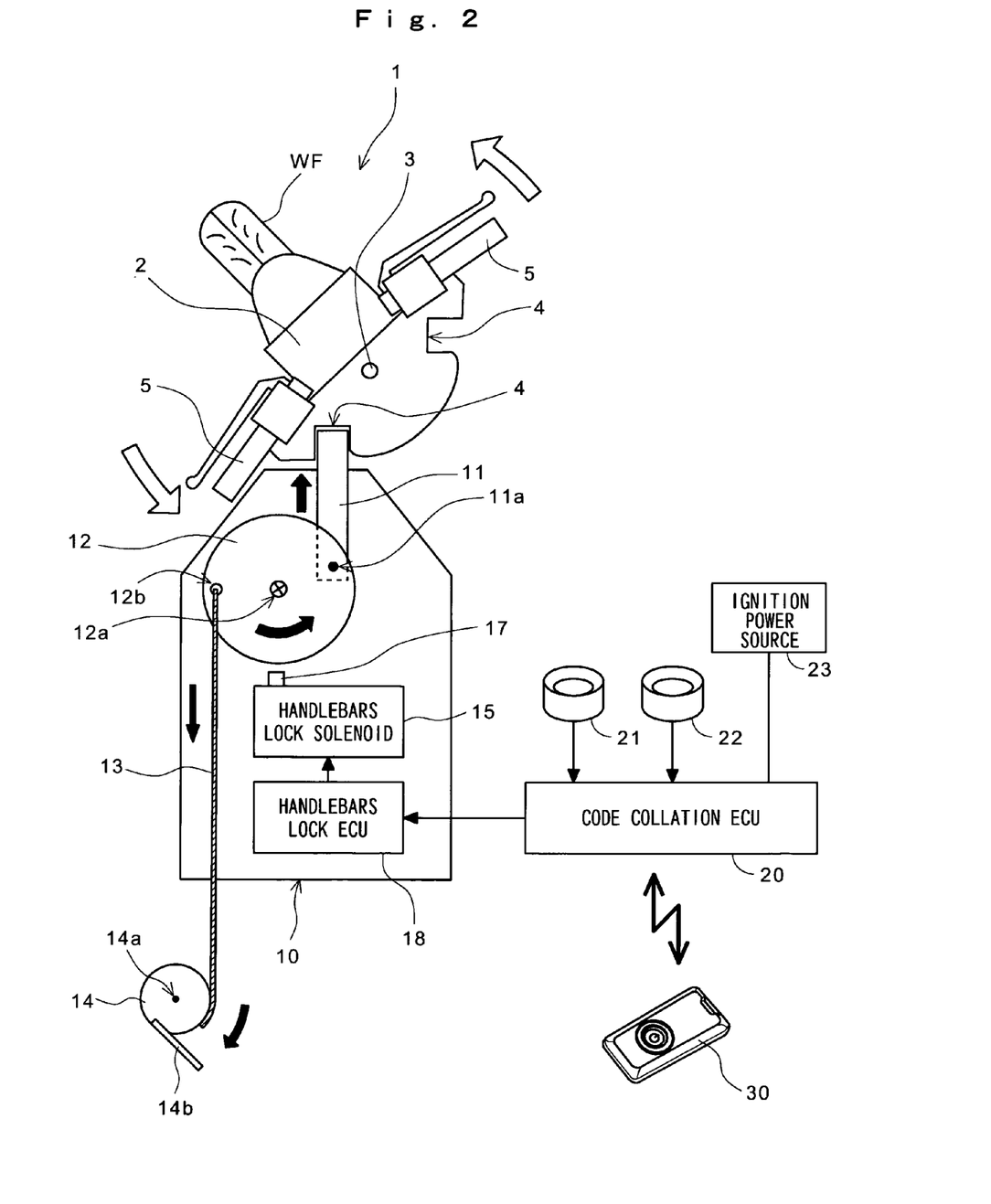
FIG. 2 is a block diagram showing a structure of a handlebars locking apparatus of a motorcycle according to the embodiment of the present invention (a locked state).

Hereinafter, a preferred embodiment of the present invention is described in detail with reference to the drawings. FIG. 1 and FIG. 2 are block diagrams showing a structure of a handlebars locking apparatus of a motorcycle according to an embodiment of the present invention. FIG. 1 shows an unlocked state of a lock of handlebars as a steering means, the lock is unlocked when the user is about to boarding and FIG. 2 shows a locked state of a lock of handlebars, the lock is locked when the user is not on board. A handlebars locking apparatus 1 of a motorcycle has a structure such that a support member 2 for supporting a pair of front forks (not illustrated) to axially support a front wheel WF is rotatably attached to a frame of a vehicle body (not illustrated) of a rotational shaft 3. Thereby, user or rider of the motorcycle can arbitrarily vary a steering angle of the front wheel WF by a handlebars 5 attached to the support member 2. On the support member 2, a lock pin engagement recesses or holes 4 to restrain rotation of the motorcycle, a steering device 1, namely, a handlebars 5, which is used upon locking of the handlebars locking apparatus, is formed. Further, the lock pin engagement recesses or holes 4 may be arranged only on one place or may be formed on other parts and on the rotational shaft 3 to be integrally rotated with the support member 2.

A handlebars lock unit 10 to be fixed on a predetermined position on a vehicle body in adjacent to the steering device 1 is provided with a rotor 12 as a rotational member to be axially supported by a rotational shaft 12a and a lock pin 11 to be engaged with the lock pin engagement recesses or holes 4 upon locking of the handlebars. The lock pin 11 is coupled with a rotational shaft 11a to be provided with deviated from the rotational shaft 12a on the rotor 12 and it can be reciprocated vertically in the FIGS. 1 and 2 in response with the rotational operation of the rotor 12. In addition, on an attachment hole 12b to be provided with deviated from the rotational shaft 12a so as to be opposed to the rotational shaft 11a, one end portion of a wire 13, which is an operational cable made of a metal or the like is attached and on other end portion thereof, a lock member 14 as an operational member to be axially supported to the vehicle body is attached by a rotational shaft 14a.

According to the above-described structure, the user of the motorcycle can make the lock pin 11 from an immersive state to a protrusion state by rotating the lock member 14 in a clockwise direction (illustrated) using an operation lever or rod 14b when the rotational position of the steering device 1 is located on a predetermined rotational position where the protrusion direction of the lock pin 11 directs to the lock pin engagement hole 4. According to the present embodiment, the operation to protrude the lock pin 11 becomes possible in the case of the handlebars locking apparatus 1 rotates about 45 degrees in an anticlockwise direction (see FIG. 2) and rotates the steering device 1 about 45 degrees in a clockwise direction from straight direction of the motorcycle.

The handlebars lock unit 10 is provided with a handlebars lock solenoid 15 for driving the latching member 17 to restrain the rotation of the rotor 12 and a handlebars lock ECU 18 to control driving of the handlebars lock solenoid 15. The latching member 17 according to the present embodiment is formed of a bolt or pin-like member which can move vertically in the drawing as being engaged with a plunger or driving element of the handlebars solenoid 15.

An collation ECU 20 forming the control unit together with the handlebars lock ECU 18 may carry out the code collation by a wireless communication with a fob or portable key 30 with a memorized specific ID code peculiar to each vehicle, and may determine whether the operation of an ignition switch 21 for switching ON and OFF of an IGN (ignition) power source 23 as a main power source of the vehicle should be accepted or not and may control driving of the handlebars lock solenoid 15 on the basis of a result of the code collation. In addition, the collation ECU 20 is configured so as to accept an operational signal from a starter button 22 to start en engine only when the IGN power source 23 is turned on and the lock pin 11 is immersed, namely, only when the lock of the handlebars is in the unlocked position.

FIGS. 3 to 8 are explanatory views showing steps of lock motion for the handlebars locking apparatus according to the present embodiment. In the structures shown in FIG. 1 and FIG. 2, some parts are given details and some parts are not illustrated, however, it is assumed that both of the structures is same. On a peripheral portion of the rotor 12, a convex portion 19 for restricting rotation of the rotor 12 is formed being engaged with the latching member 17 on its ends and the convex portion 19 has a predetermined length in a circumferential direction. The latching member 17 is provided with a spring force in a direction toward a periphery of the rotor 12 by a spring 25 as a biasing member, and only when the handlebars lock solenoid 15 drives a driving element 16, the latching member 17 moves to the position where it is not engaged with the convex portion 19 and returns to an initial position in accordance with OFF of the driving signal.

In addition, a spring 24 as a biasing member 24 for giving a bias force in a direction to rotate the rotor 12 in an illustrated clockwise direction, namely, giving a bias force that acts in a direction to make the lock pin 11 in an immersed state is attached to the attachment hole 12b of the rotor 12. This biasing member 24 can be formed by a spring made of a metal or the like. Further, the convex portion 19 may be engaged with the latching member 17 as being made into a predetermined concave shape and the driving element 16 may be integrally formed with the latching member 17.

Figure 5:
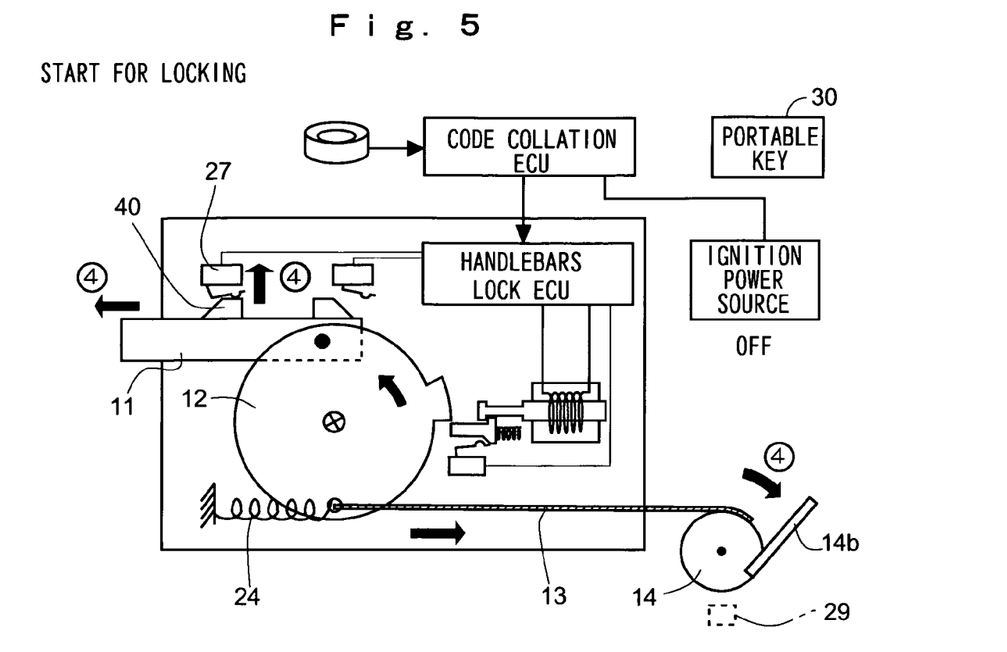
FIG. 5 is an explanatory view showing a flow of the operation upon locking (locking is started).

In the vicinity of the latching member 17, a latching switch 26 for detecting the protrusion or latching state of the latching member 17 is arranged. In the vicinity of the lock pin 11, a lock side switch 27 for detecting the protrusion state of the lock pin 11 having contact with a locked side protrusion 40 formed in the lock pin 11 and an unlock side switch 28 for detecting the immersive state of the lock pin 11 having contact with an unlocked side protrusion 41 formed in the lock pin 11 are arranged. Further, detection of the protrusion state and the immersive state of the lock pin 11 may be carried out by a switch or the like to detect the rotational position of the rotor 12. In addition, ON and OFF of the latching switch 26 maybe detected. Alternatively, as shown in FIG. 5, providing a detection switch 29 to detect the operation of the lock member 14, when the operation of the lock member 14 to a predetermined lock position is detected, the code collation may be started. According to this structure, it is possible to advance start timing of the code collation.

Figure 3:
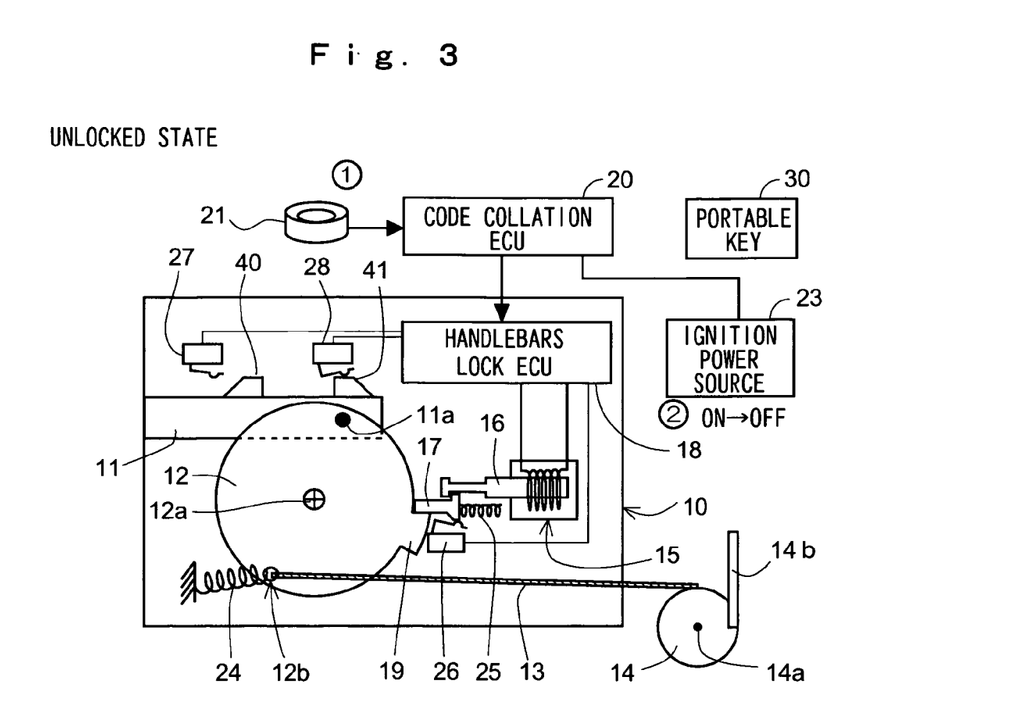
FIG. 3 is an explanatory view showing a flow of the operation upon locking (an unlocked state).
Figure 4:
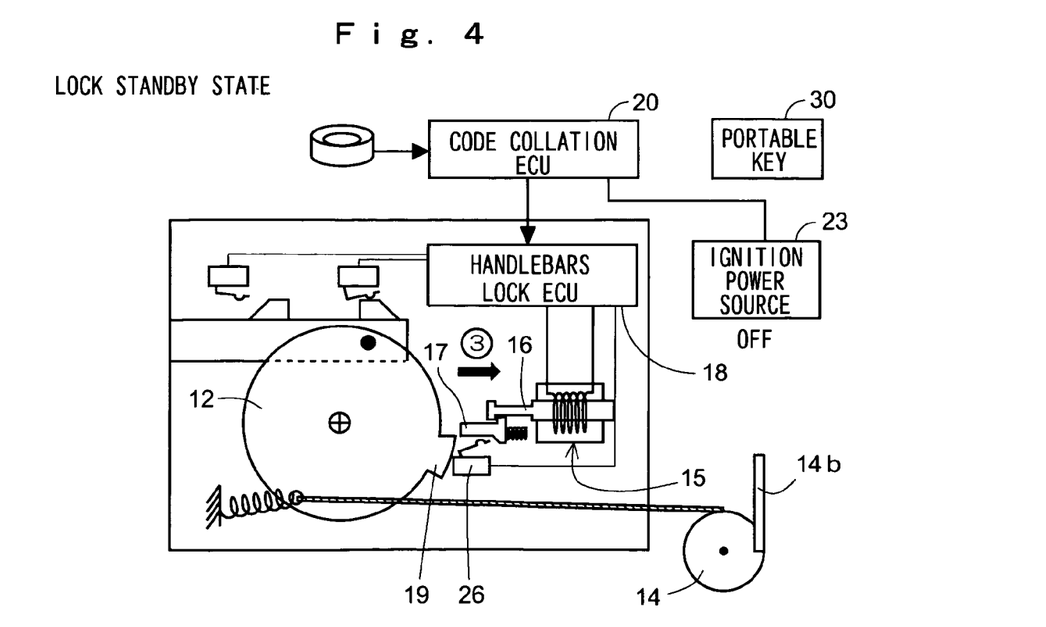
FIG. 4 is an explanatory view showing a flow of the operation upon locking (a lockable state).
Figure 8:
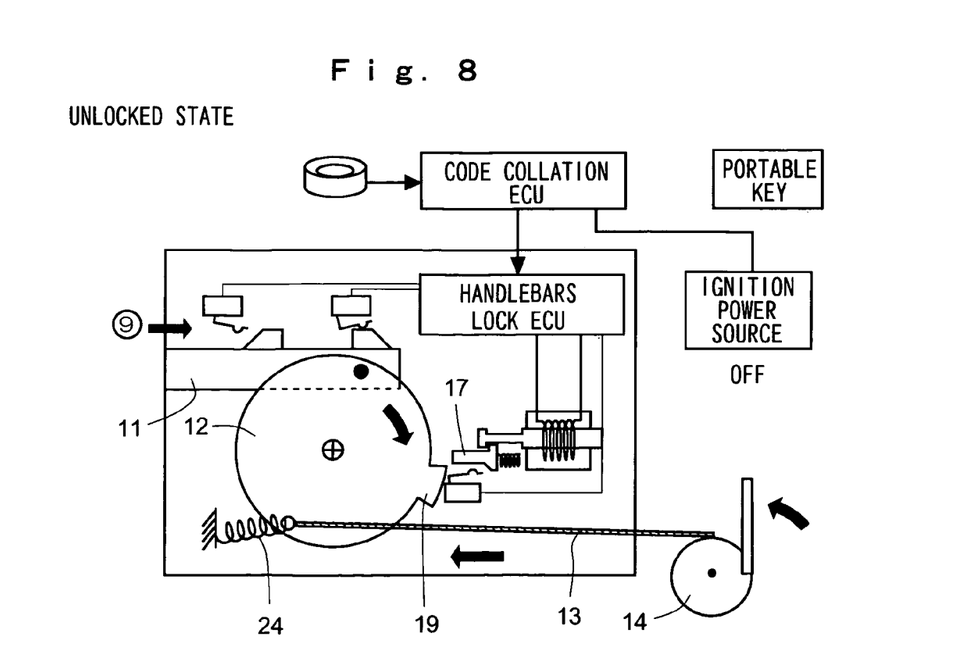
FIG. 8 is an explanatory view showing a flow of the operation upon locking (an unlocked state).
Figure 9:
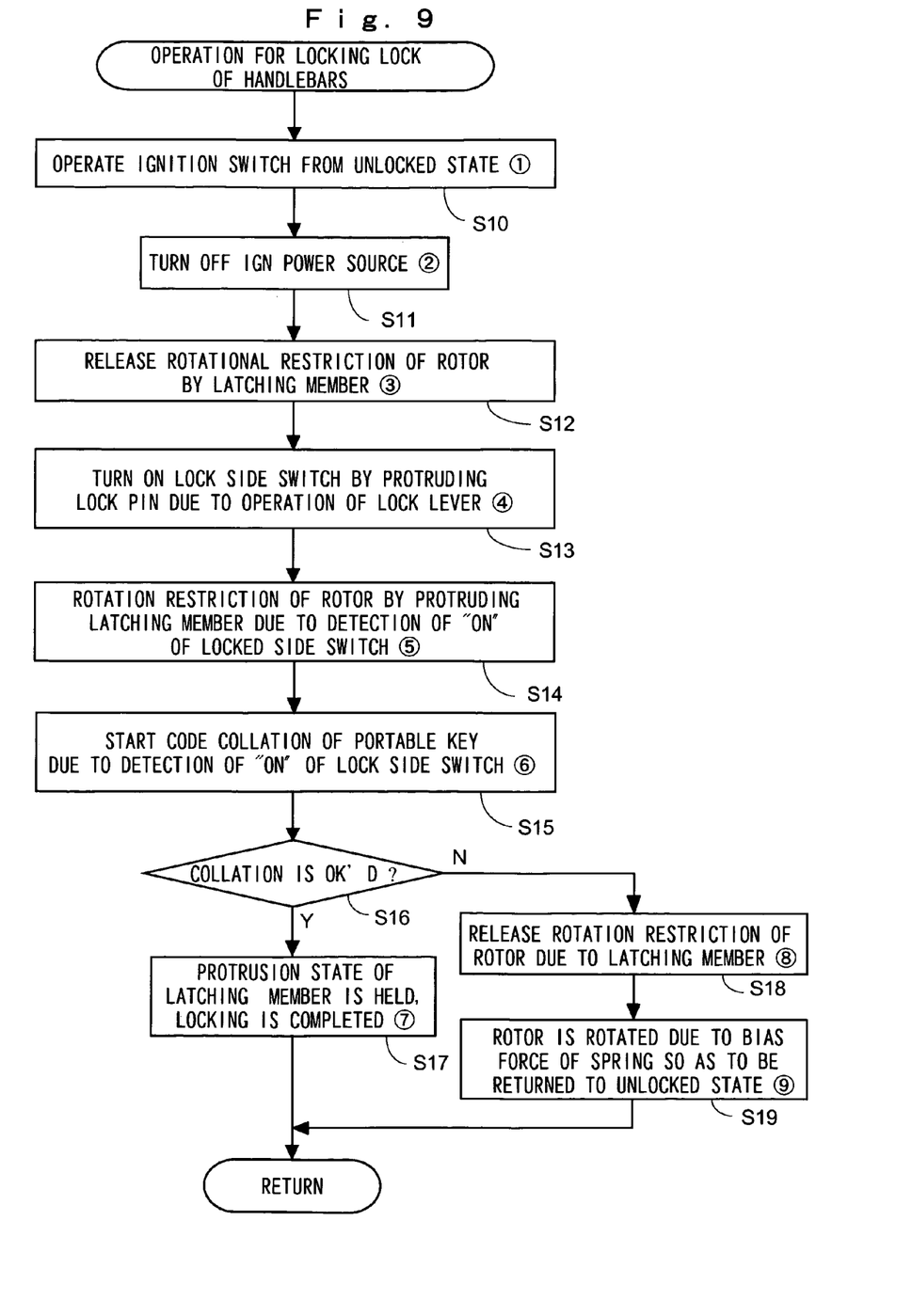
FIG. 9 is a flow chart showing a procedure upon switching the handlebars locking apparatus from the unlocked state into the locked state.

Hereinafter, a flow for switching the handlebars locking apparatus from the unlocked state to the locked state when the user gets off a vehicle according to the present embodiment is described together with the flowchart of FIG. 9. In FIGS. 3-8, the number of steps are corresponding to the flow chart of FIG. 9 with circled number. At first, the unlocked state shown in FIG. 3 represents the state that the IGN power source 23 is turned on yet after the vehicle such as a motorcycle is stopped. In the unlocked state, the latching member 17 is engaged with the rotor 12, so that the rotor 12 cannot be rotated and the lock lever 14b is also cannot be rotated.

From this unlocked state, by operating the ignition switch 21 is operated ((1): Step S10), the IGN power source 23 is turned off ((2): Step S11) Next, with reference to FIG. 4, in accordance with OFF of the IGN power source 23, the handlebars lock ECU 18 may drive the handlebars lock solenoid 15 and the restricted rotation of the rotor 12 due to the latching member 17 is released ((3): Step S12). Thereby, it is changed to a lockable state that can rotate the rotor 12.

Consequently, with reference to FIG. 5, in order for the user to start the locking of the handlebars 5, rotating the handlebars 5 to a predetermined rotational position where the protrusion direction of the lock pin 11 coincides with the position of the lock pin engagement recesses or holes 4 and then, operating the lock lever 14b with a force against the bias force of the biasing member 24, the rotor 12 is rotated and the lock pin 11 is made into the protrusion state and further, the locked side protrusion 40 comes into contact with the lock side switch 27 and the lock side switch 27 is turned on ((4): Step S13).

Figure 6:
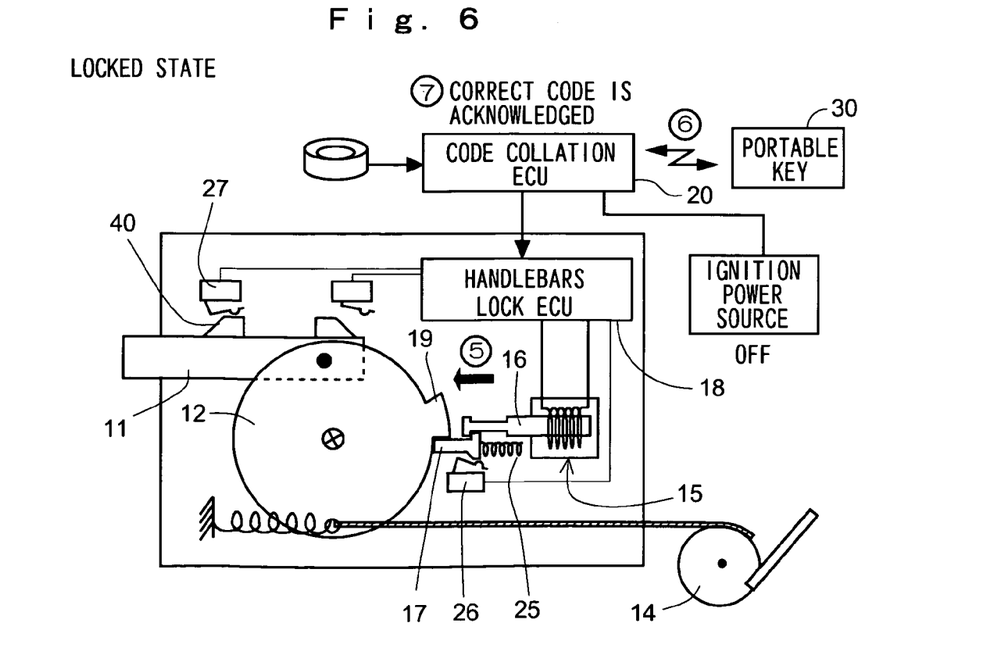
FIG. 6 is an explanatory view showing a flow of the operation upon locking (a locked state).

In FIG. 6, when the on-state of the lock side switch 27 is detected, an electric power supplying to the handlebars lock solenoid 15 is turned off and due to the bias force of the biasing member 25, the latching member 17 is protruded ((5): Step S14). Thereby, the rotation of the rotor 12 is restricted and the locked state such that the lock pin 11 does not return even if the user releases his or her hand from the lock lever 14b. However, this locked state is a tentative locked state and the collation ECU 20 may start the code collation with the portable key 30 in accordance with detection of the on-state of the lock side switch 27 ((6): Step S15). Then, the collation ECU 20 may determine whether or not the code collation is carried out correctly (step S16), if it is determined that the user having the portable key 30 having a specific ID code peculiar to the vehicle body operates the lock lever 14b, protrusion of the latching member 17 is held and an authorized locked state is obtained, and then, the locking operation is completed ((7): Step S17). This collation may be carried out by detecting OFF of the unlock side switch 28 or ON of the latching switch 26.

Figure 7:
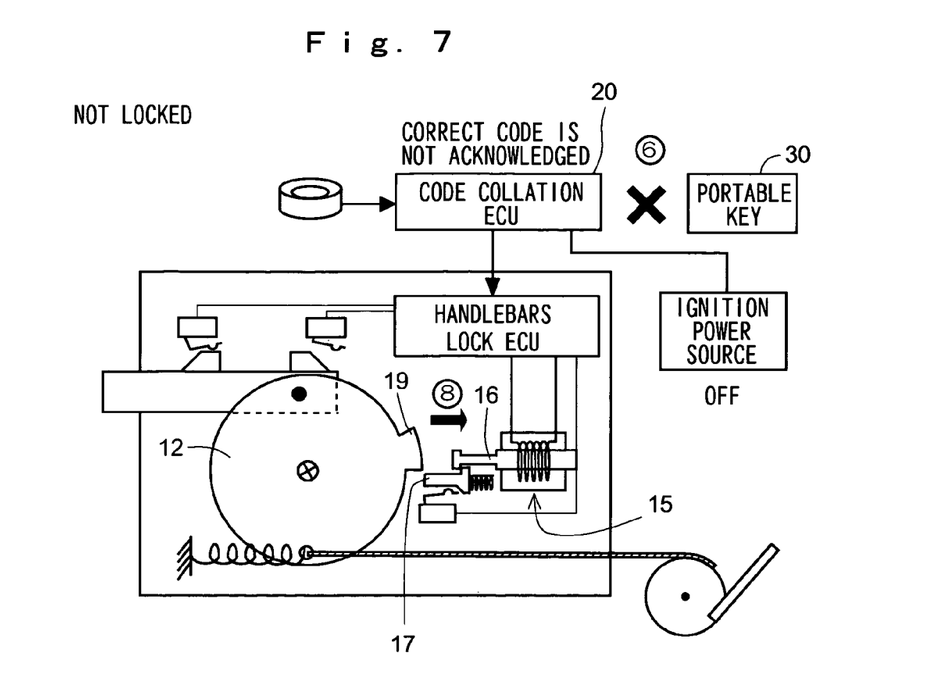
FIG. 7 is an explanatory view showing a flow of the operation upon locking (locking is not good).

On the other hand, with reference to FIG. 7, if it is determined that the result of the code collation is not correct, assuming that a person who does not have a predetermined portable key 30 operates the lock lever 14b, driving the handlebars lock solenoid 15, the restriction of the rotation of the rotor 12 is released again ((8): Step S18). With reference to FIG. 8, then, the lock pin 11 is returned to the immersive state due to a bias force of the biasing member 24 in accordance with release of the restriction of the rotor 12, so that the state is returned to the unlocked state ((9): Step S19). The code collation is carried out at the same time as detection of ON of the lock side switch 27 since thus, the collation is carried out after checking the user's intention to lock and this is to prevent locking even when the user has no intention to lock. Further, in FIG. 6, a tentative locked state is obtained by the latching member 17 at the same time as detection of the ON state of the lock side switch 27 because it is necessary to maintain the state that the lock member 14 has been rotated until the code collation requiring a predetermined time is completed and the latching member 17 has been protruded assuming the setting that the latching member 17 is protruded after completion of the code collation, for example. At the same time, even if the lock lever 14b is released before the code collation is completed, it is also possible to avoid the situation such that the latching member 17 cannot be protruded and the restriction of rotation cannot be made.

As described above, according to the handlebars locking apparatus of the present embodiment, in the case that the IGN power source 23 is turned on, rotation of the rotor 12 is restricted and the protrusion operation of the lock pin 11 is restrained. In addition, also in the case that the IGN power source 23 is turned off, the code collation is not carried out just after the power source is turned off but the code collation with the portable key 30 specific to the vehicle body is carried out after the operation of the lock lever 14b is detected, so that it is possible to switch the unlocked state to the locked state depending on the operation by the person who does not have the portable key 30 and it is possible to check the user's intention to lock even when the IGN power source is turned off.

Figure 10:
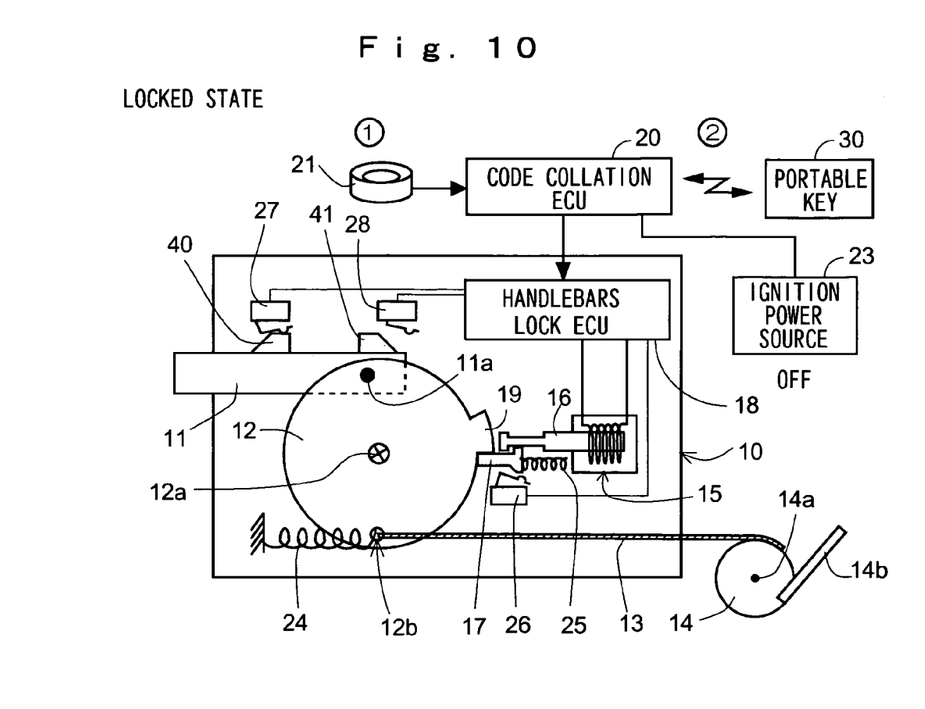
FIG. 10 is an explanatory view showing a flow of the operation upon unlocking (a locked state).
Figure 11:
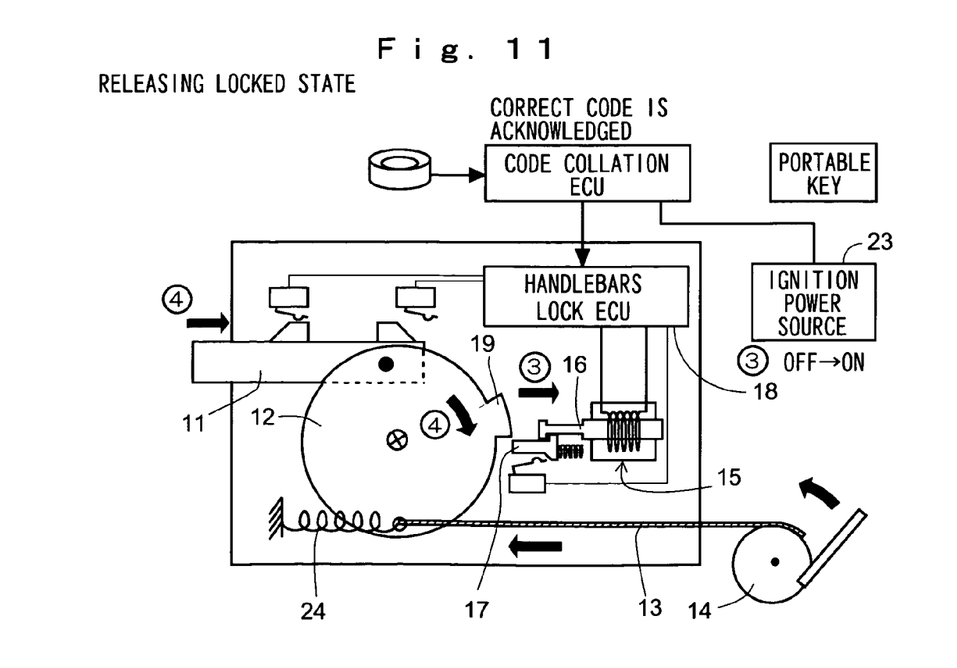
FIG. 11 is an explanatory view showing a flow of the operation upon unlocking (locking is released).
Figure 12:
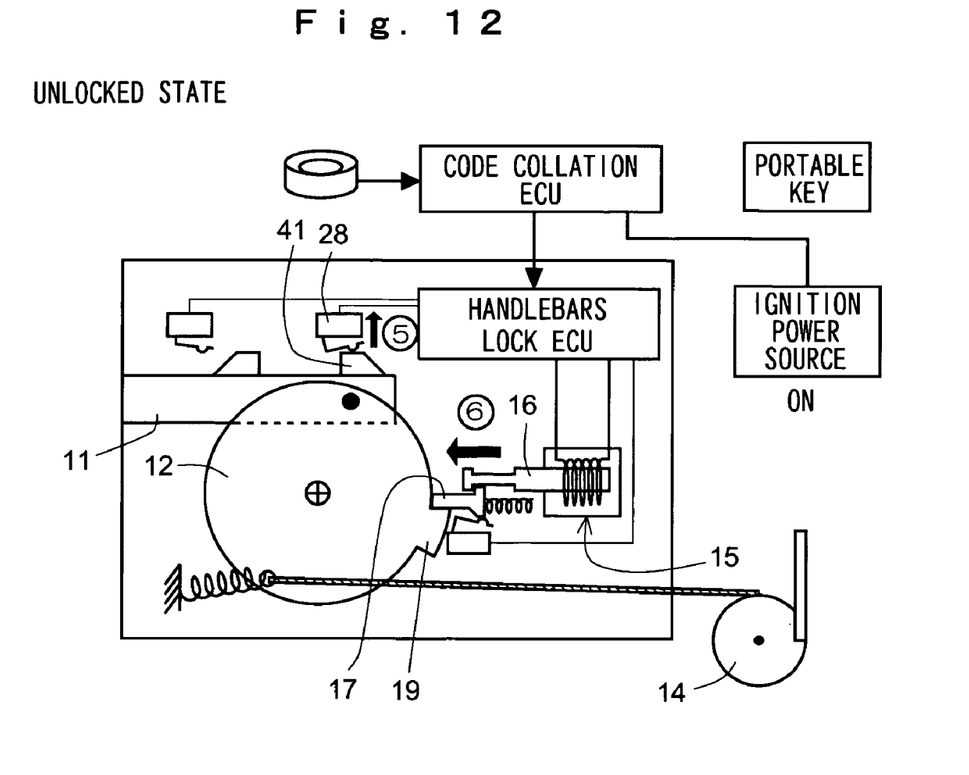
FIG. 12 is an explanatory view showing a flow of the operation upon unlocking (an unlocked state).
Figure 13:
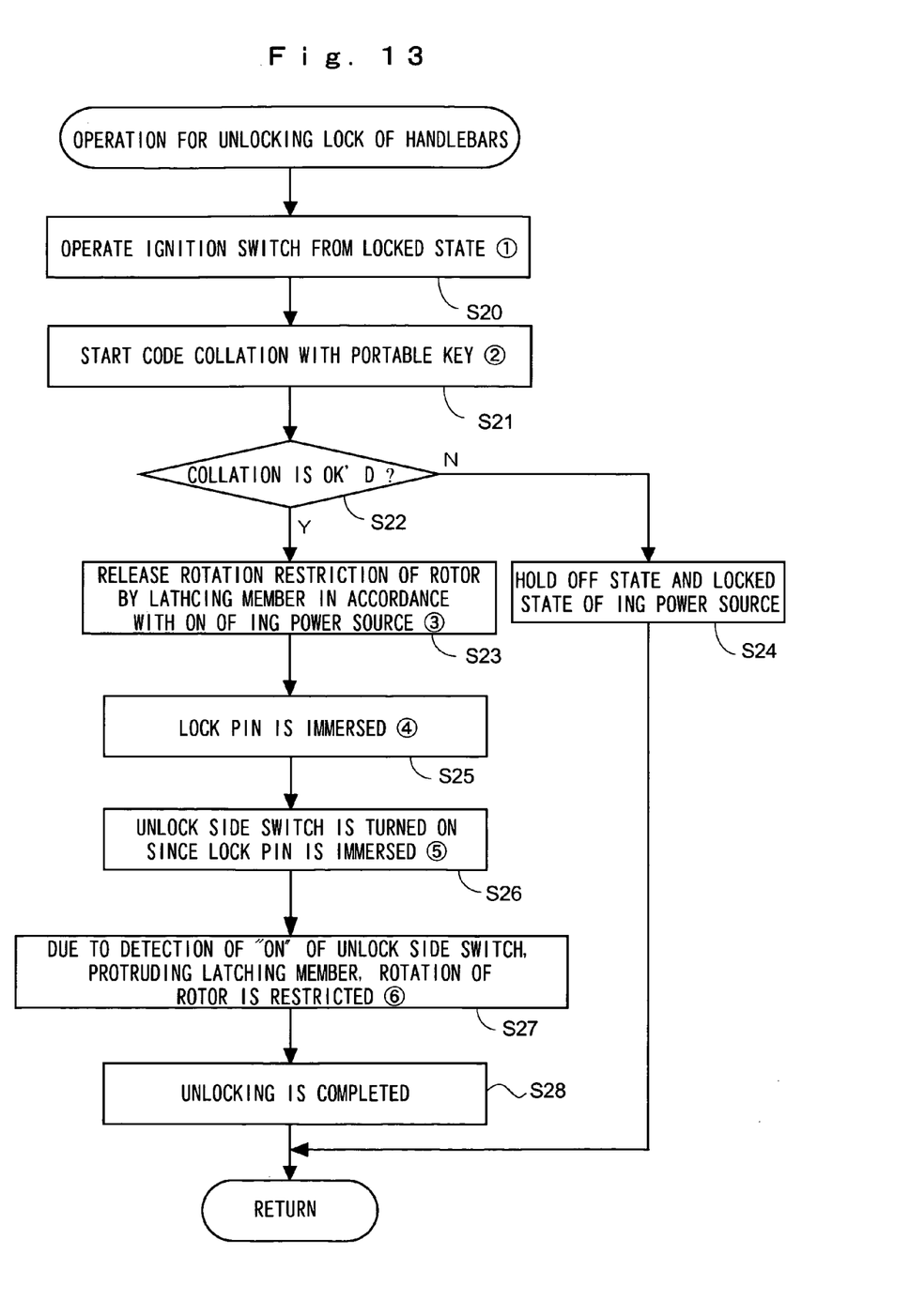
FIG. 13 is a flow chart showing a procedure upon switching the handlebars locking apparatus from the locked state into the unlocked state.

FIGS. 10 to 12 are explanatory views showing flows of the operation upon locking of a handlebars locking apparatus according to the present embodiment when a user is getting on a vehicle. The same reference numerals as the above indicate the identical or the equal parts. Hereinafter, the flow to switch the locked state to the unlocked state is explained together with a flow chart of FIG. 13. The parts corresponding to the flowcharts are provided with the number of steps thereof. In the locked state shown in FIG. 10, as illustrated in the above-mentioned procedure upon locking, the IGN power source 23 is made into the OFF state. When the ignition switch 21 is operated from this locked state ((1): Step S20), the collation ECU 20 starts the code collation with the portable key 30 ((2): Step S21).

Next, determining whether or not the code collation is correctly carried out (Step S22), if determination is affirmative, namely, if it is determined that the user having a predetermined portable key 30 operates the ignition switch 21, turning on the IGN power source 23 and driving the handlebars lock solenoid 15 by means of the handlebars lock ECU 18, the restriction of the rotation of the rotor 12 by means of the latching member 17 is released ((3): Step S23). Thereby, the rotor 12 is rotated in the illustrated clockwise direction due to the bias force of the biasing section 24, the lock pin 11 is pulled in accordance with the rotational movement and the lock pin 11 is switched into the immersive state ((4): Step S25).

With reference to FIG. 12, when the lock pin 11 is switched into the immersive state, the unlocked side protrusion 41 has contact with the unlock side switch 28 and the unlock side switch 28 is turned ON ((5): Step S26). Then, if the ON-state of the unlock side switch 28 is detected, the electric power distribution to the handlebars lock solenoid 15 is turned off, and carrying out the restriction of the rotation of the rotor 12 by means of the latching member 17 again ((6): Step S27), then the unlocking operation is completed (Step S28). Further, this rotation restriction has been held during ON-state of the IGN power source 23, so that it is possible to surely hold the immersive state of the lock pin 11. If determination is negative in the determination whether or not the code collation is correctly carried out (Step S22), assuming that a person who does not have a predetermined portable key 30 operates the ignition switch 21, the OFF-state and the locked state of the IGN power source 23 is held and a series of the control is completed.

As described above, according to the handlebars locking apparatus of the present embodiment, the code collation with the portable key 30 that is specific to the vehicle when the ignition switch 21 is operated, so that it is possible to prevent switching from the locked state into the unlocked state by the operation of the person who does not have the portable key 30. In addition, it is possible to prevent locking when the operator does not intend to operate the apparatus since the code is authenticated and the handlebars is locked after the operation for protruding the lock pin by the user, namely, after the user's intention to operate the apparatus is checked in the case that a main power source is turned off.

The handlebars locking apparatus according to the present embodiment can be applied not only to a motorcycle but also various vehicles such as a three or four-wheeled motor vehicle. Further, the formations of the parts included in the handlebars lock unit, the shapes and the arrangements or the like of the rotor, the lock pin, the latching member, the lock side switch, the unlock side switch, the latching switch, the operation member, and the biasing member or the like are not limited to the above-described embodiments but various modifications are available. For example, the structure such that the handlebars lock ECU is included in the collation ECU or the structure such that the ignition switch is formed by a key cylinder that is rotated by a physical key having an IC chip incorporated therein can be employed.

What is claimed is:

1. A steering means locking apparatus having a locked and an unlocked configuration, comprising:
    an operational member;
    a lock pin movable between a protruded position and a retracted position in response to an operation of the operational member;
    a biasing means for biasing the lock pin to the retracted position;
    a latching means for restricting movement of the lock pin between the protruded position and the retracted position; and
    a control unit for controlling driving of the latching means; wherein,
    the control unit is configured to;
        detect a change of a main power source of a vehicle from an ON to an OFF state;
        release the movement restriction of the lock pin restricted by the latching means in response to the detection of the OFF state,
        determine if the lock pin is in the protruded position;
        carry out code collation of a portable key's code, when the lock pin is determined to be in the protruded position subsequent to the release of the movement restriction of the lock pin, wherein the code is associated with a specific vehicle;
        maintain the lock pin via the latching means in the protruded position to place the steering means in the locked configuration if the code collation is correctly carried out; and
        maintain the release of the movement restriction of the lock pin via the latching means to prevent the steering means from being placed in the locked configuration if the code collation is not correctly carried out.

2. A steering means locking apparatus according to claim 1, wherein the control unit is further configured to;
    detect a change of a main power source of the vehicle from the OFF to the ON state:

carry out code collation of a portable key's code in response to the detection of the ON state;

drive the latching means to release the movement restriction of the lock pin thereby allowing the steering means to be placed in the unlocked configuration if the code collation is correctly carried out; and maintain the movement restriction of the lock pin via the latching means to prevent the steering means from being placed in the unlocked configuration if the code collation is not correctly carried out.

3. The steering means locking apparatus according to claim 1, further comprising:

a lock side switch to detect that the lock pin is in the protruded position; and an unlock side switch to detect that the lock pin is in the retracted position.

4. The steering means locking apparatus according to claim 2, further comprising:

a lock side switch to detect that the lock pin is in the protruded position; and an unlock side switch to detect that the lock pin is in the retracted position.

5. The steering means locking apparatus according to claim 1, wherein the control unit is further configured to:

release the movement restriction of the lock pin if the switch from the ON state to the OFF state is detected when the lock pin is in the retracted position; and carry out the code collation when an output signal from a lock side switch or an unlock side switch is detected indicating that the lock pin is in the protruded position as the result of the operation of the operational member after the movement restriction is released.

6. The steering means locking apparatus according to claim 2, wherein the control unit is further configured to:

release the movement restriction of the lock pin if the switch from the ON state to the OFF state is detected when the lock pin is in the retracted position; and carry out the code collation when an output signal from a lock side switch or an unlock side switch is detected indicating that the lock pin is in the protruded position as the result of the operation of the operational member after the movement restriction is released.

7. A steering means locking apparatus having a locked and an unlocked configuration, comprising:

an operational member;

a lock pin movable between a protruded position and a retracted position in response to an operation of the operational member;

a biasing means for biasing the lock pin to the retracted position;

a latching means for restricting movement of the lock pin between the protruded position and the retracted position; and a control unit for controlling driving of the latching means; wherein the control unit is configured to;

detect a change of a main power source of a vehicle from an ON to an OFF state;

detect an operation of the operational member that forces the lock pin to the protruded position;

carry out code collation of a portable key's code, wherein the code is peculiar to a specific vehicle, subsequent to the detection of both the OFF state and the operation of the operational member;

maintain the lock pin via the latching means in the protruded position to place the steering means in the locked configuration if the code collation is correctly carried out; and maintain a release of the movement restriction of the lock pin via the latching means to prevent the steering means from being placed in the locked configuration if the code collation is not correctly carried out.

8. A steering means locking apparatus according to claim 7, wherein the control unit is further configured to;

detect a change of a main power source of the vehicle from the OFF to the ON state:

carry out code collation of a portable key's code in response to the detection of the ON state;

drive the latching means to release the movement restriction of the lock pin thereby allowing the steering means to be placed in the unlocked configuration if the code collation is correctly carried out; and maintain the movement restriction of the lock pin via the latching means to prevent the steering means from being placed in the unlocked configuration if the code collation is not correctly carried out.

9. The steering means locking apparatus according to claim 7, further comprising:

a lock side switch to detect that the lock pin is in a the protruded position; and an unlock side switch to detect that the lock pin is in the retracted position.

10. The steering means locking apparatus according to claim 7, wherein the control unit is further configured to:

release the movement restriction of the lock pin if the switch from the ON state to the OFF state is detected when the lock pin is in the retracted position; and carry out the code collation when an output signal from a lock side switch or an unlock side switch is detected indicating that the lock pin is in the protruded position as the result of the operation of the operational member after the movement restriction is released.

11. The steering means locking apparatus according to claim 8, wherein the control unit is further configured to:

release the movement restriction of the lock pin if the switch from the ON state to the OFF state is detected when the lock pin is in the retracted position; and carry out the code collation when an output signal from a lock side switch or an unlock side switch is detected indicating that the lock pin is in the protruded position as the result of the operation of the operational member after the movement restriction is released.

12. The steering means locking apparatus according to any one of claims 3-11, wherein:

the steering means locking apparatus further comprises a rotational member coupled with the lock pin;

the rotational member is connected to the operational member via an operation cable;

the lock pin is configured to be coupled with the rotational member so as to carry out reciprocating movement in conjunction with the rotation of the rotational member and causing the lock pin to transition from the retracted position to the protruded position thereby making it impossible to operate a steering means of a vehicle;

the latching means restricts the rotation of the rotational member and comprises a latching switch to detect a movement restriction state of the lock pin based on a position of the latching means;

the biasing means is attached to the rotational member so as to provide a bias force to rotate the rotational member into a direction that forces the lock pin into the retracted position; and the lock side switch and the unlock side switch are configured to detect the respective protruded position and refracted position of the lock pin.

* * * * *